(12) United States Patent
Johns et al.

(10) Patent No.: US 7,397,624 B2
(45) Date of Patent: Jul. 8, 2008

(54) TRANSDUCERS FOR FERROELECTRIC STORAGE MEDIUM

(75) Inventors: Earl C. Johns, Sewickley, PA (US);
Mark I. Lutwyche, Mars, PA (US);
Yiao-Tee Hsia, Wexford, PA (US);
James D. Kiely, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 785 days.

(21) Appl. No.: 10/702,348

(22) Filed: Nov. 6, 2003

(65) Prior Publication Data

US 2005/0128616 A1  Jun. 16, 2005

(51) Int. Cl.
*G11B 21/02* (2006.01)
*G11C 11/22* (2006.01)
*G11B 5/55* (2006.01)

(52) U.S. Cl. .......................... 360/75; 360/135; 365/145
(58) Field of Classification Search .................. None
See application file for complete search history.

(56) References Cited

U.S. PATENT DOCUMENTS

| | | | |
|---|---|---|---|
| 3,703,328 A | 11/1972 | Glass et al. | 350/3.5 |
| 3,806,902 A * | 4/1974 | Drees et al. | 360/129 |
| 3,940,750 A | 2/1976 | Voegeli | 340/174 |
| 4,041,477 A | 8/1977 | Drenckhan | 340/173 |
| 4,099,247 A | 7/1978 | Mikada et al. | 364/710 |
| 4,103,341 A | 7/1978 | Brody | 365/117 |
| 4,153,328 A | 5/1979 | Wang | 350/96.11 |
| 4,187,109 A | 2/1980 | Mageumi et al. | 430/2 |
| 4,195,355 A | 3/1980 | Rohrer | 365/145 |
| 4,220,395 A | 9/1980 | Wang et al. | 350/96.12 |
| 4,319,355 A | 3/1982 | Mollier | 371/21 |
| 4,344,155 A | 8/1982 | Mollier | 365/200 |
| 4,551,819 A | 11/1985 | Michl et al. | 365/120 |
| 4,649,519 A | 3/1987 | Sun et al. | 365/122 |
| 4,731,754 A | 3/1988 | Ogden et al. | 365/121 |
| 4,794,560 A | 12/1988 | Bell et al. | 365/122 |
| 4,832,456 A | 5/1989 | Yamazaki et al. | 350/334 |
| 4,858,040 A | 8/1989 | Hazebrouck | 360/78.05 |
| 4,927,220 A | 5/1990 | Hesselink et al. | 350/3.64 |
| 4,954,951 A | 9/1990 | Hyatt | 364/200 |
| 4,956,784 A | 9/1990 | Hadavi et al. | 364/468 |
| 4,977,540 A | 12/1990 | Goodwin et al. | 365/49 |
| 4,988,891 A | 1/1991 | Mashiko | 307/201 |
| 5,004,309 A | 4/1991 | Caulfield et al. | 350/3.68 |
| 5,005,927 A | 4/1991 | Cudney et al. | 350/3.64 |

(Continued)

OTHER PUBLICATIONS

"Nanoscale control of ferroelectric polarization and domain size of epitaxial Pb $(Zr_{0.2}Ti_{0.8})O_3$ thin films" by P. Paruch et al., *Applied Physics Letters*, vol. 79, No. 4, pp. 530-532, Jul. 23, 2001.

(Continued)

*Primary Examiner*—Jason Olson
(74) *Attorney, Agent, or Firm*—Westman, Champlin & Kelly, P.A.

(57) ABSTRACT

A ferroelectric transducer for use with a ferroelectric storage medium includes a read electrode. The read electrode emits a current when a polarity orientation of the read electrode is opposite a polarity orientation of a ferroelectric domain on the storage medium.

26 Claims, 7 Drawing Sheets

U.S. PATENT DOCUMENTS

| | | | |
|---|---|---|---|
| 5,014,235 A | 5/1991 | Morton | 364/900 |
| 5,051,950 A | 9/1991 | Evans, Jr. et al. | 365/109 |
| 5,132,811 A | 7/1992 | Iwaki et al. | 359/6 |
| 5,132,813 A | 7/1992 | Caulfield et al. | 359/11 |
| 5,151,822 A | 9/1992 | Hekker et al. | 359/559 |
| 5,175,775 A | 12/1992 | Iwaki et al. | 382/31 |
| 5,179,533 A | 1/1993 | Bullington et al. | 365/110 |
| 5,216,631 A | 6/1993 | Sliwa, Jr. | 365/174 |
| 5,233,554 A | 8/1993 | Conley et al. | 364/822 |
| 5,239,504 A | 8/1993 | Brady et al. | 365/157 |
| 5,261,055 A | 11/1993 | Moran et al. | 395/275 |
| 5,291,584 A | 3/1994 | Challa et al. | 395/500 |
| 5,307,311 A | 4/1994 | Sliwa, Jr. | 365/174 |
| 5,343,426 A | 8/1994 | Cassidy et al. | 365/189.02 |
| 5,359,565 A | 10/1994 | Takatori | 365/105 |
| 5,359,726 A | 10/1994 | Thomas | 395/500 |
| 5,361,238 A | 11/1994 | Owechko | 365/234 |
| 5,372,859 A | 12/1994 | Thakoor | 427/551 |
| 5,379,266 A | 1/1995 | Russell | 365/234 |
| 5,388,267 A | 2/1995 | Chan et al. | 395/700 |
| 5,410,680 A | 4/1995 | Challa et al. | 395/500 |
| 5,423,054 A | 6/1995 | Schmidt et al. | 395/800 |
| 5,426,075 A | 6/1995 | Perino et al. | 437/235 |
| 5,426,769 A | 6/1995 | Pawloski | 395/500 |
| 5,428,417 A | 6/1995 | Lichtenstein | 353/122 |
| 5,432,950 A | 7/1995 | Sibigtroth | 395/425 |
| 5,886,922 A * | 3/1999 | Saito et al. | 365/164 |
| 6,515,957 B1 | 2/2003 | Newns et al. | 369/126 |
| 7,221,639 B2 * | 5/2007 | Onoe et al. | 369/126 |
| 2002/0093883 A1 | 7/2002 | Chang et al. | 369/13.56 |
| 2002/0109947 A1 * | 8/2002 | Khizroev et al. | 360/319 |
| 2005/0044695 A1 * | 3/2005 | Fong et al. | 29/603.03 |

OTHER PUBLICATIONS

"Tbit/inch$^2$ ferroelectric data storage based on scanning nonlinear dielectric microscopy", by Y. Cho et al., *Applied Physics Letters*, vol. 81, No. 23, pp. 4401-4403, Dec. 2, 2002.

* cited by examiner

FIG. 4
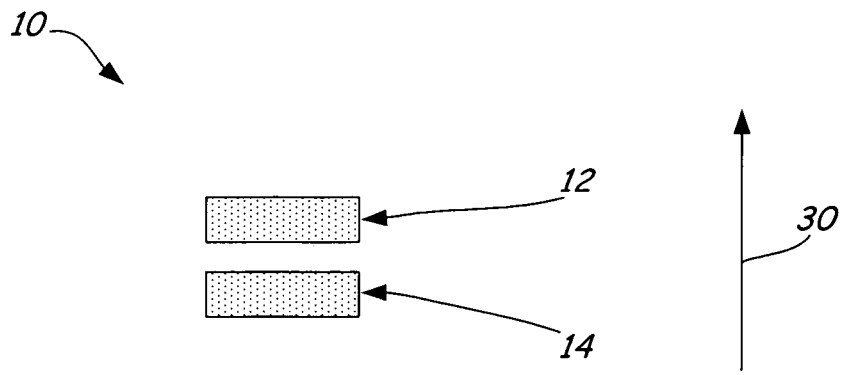
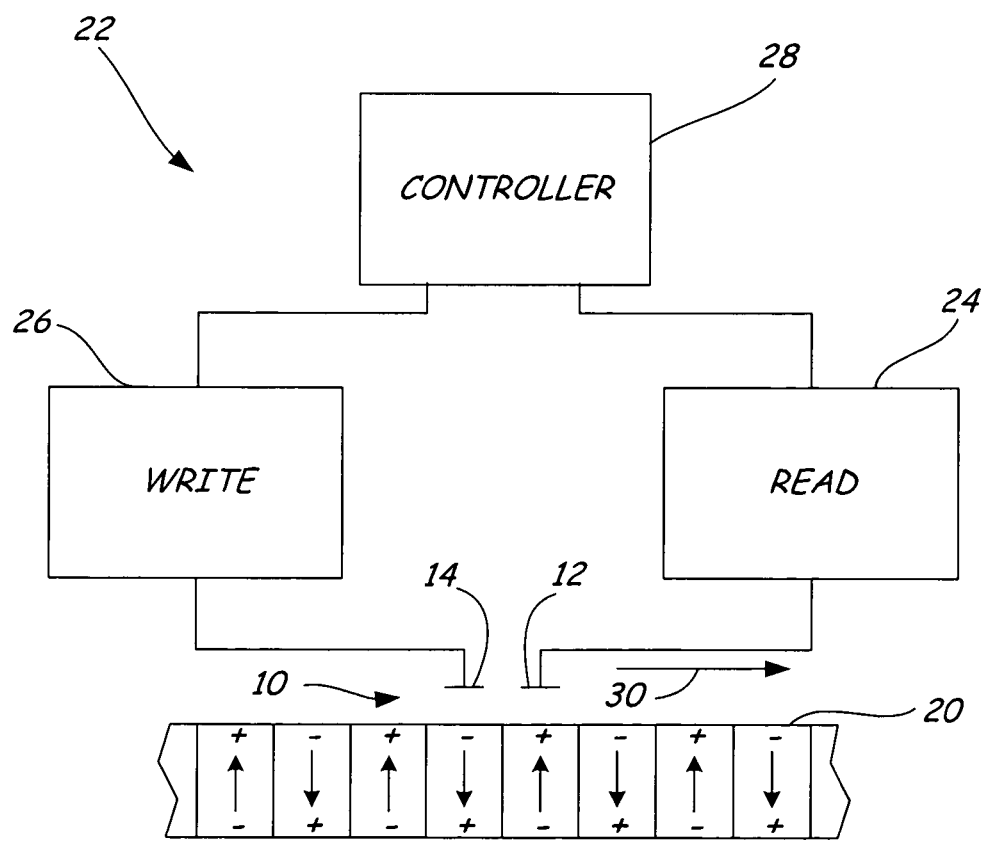
Fig. 5

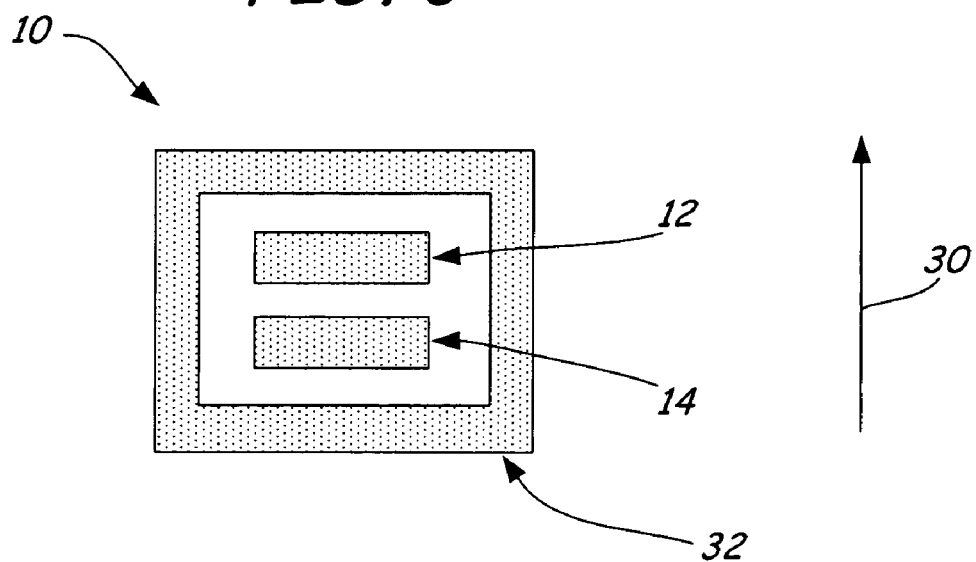

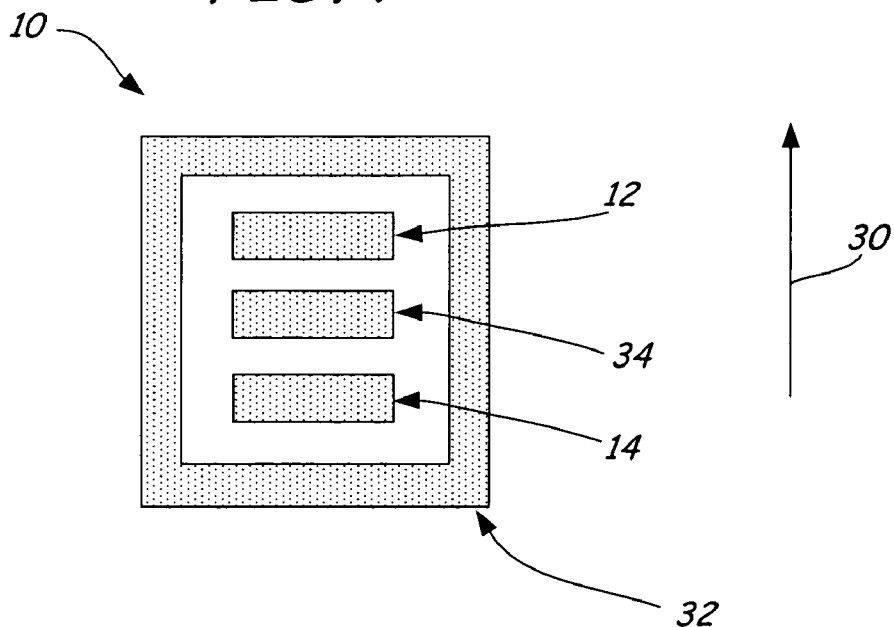
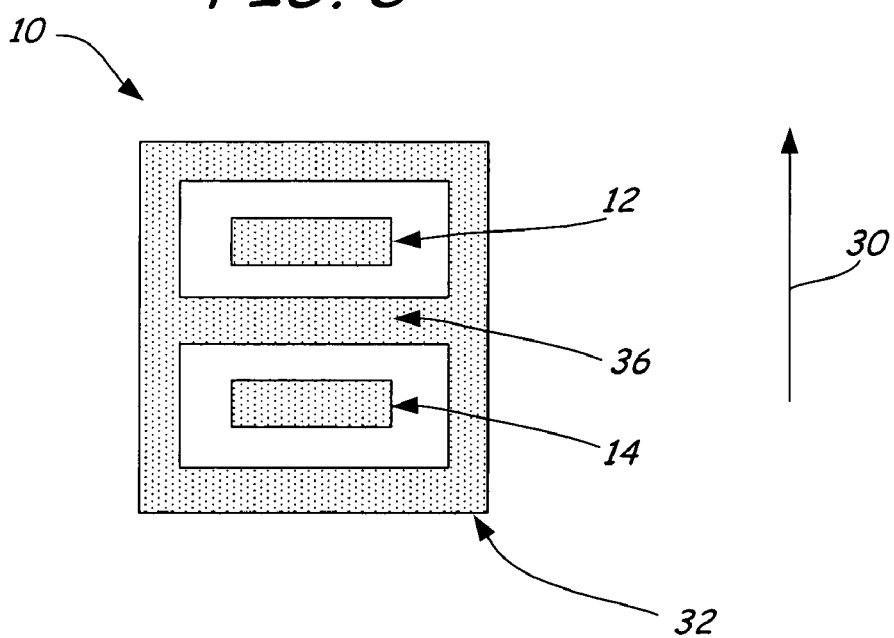

TRANSDUCERS FOR FERROELECTRIC STORAGE MEDIUM

FIELD OF THE INVENTION

The present invention relates to the transducers used in data storage systems. More specifically, the present relates to a transducer for use with a ferroelectric storage medium.

BACKGROUND OF THE INVENTION

Increased storage capacity in magnetic recording has traditionally been addressed through improvements in the ability to store information on a particular storage disc with an increased areal density, e.g., decreasing the size of the inductive write element and read back sensor in a magnetic recording system. Until recently, these prior art approaches have been adequate for increasing the storage capacity of magnetic recording discs.

Typically in magnetic recording, the magnetic vectors of ferromagnetic domains in a storage medium are arranged in a coherent manner to store data. For example, if the vector direction between adjacent domains is reversed, a binary "1" can be stored.

The areal density in magnetic recording technologies has now reached 60 to 70 Gbit/in$^2$ in certain magnetic storage medium, and is increasing at a rate of between 60% and 100% per year. Further, data rates are increasing at a rate of approximately 30% to 40% per year. However, one limitation of magnetic storage technologies is due to the ferromagnetic domains themselves. As the size of the ferromagnetic domains are reduced in the storage medium in order to achieve higher packing densities, the anisotropy energy of the magnetic domain decreases. Below what is known as the "superparamagnetic" limit, the thermal energy can overcome the magnetic anisotropy such that it is not possible to record data.

Ferroelectric materials also have domains. However, with ferroelectric materials, the domains are formed by charged regions rather than magnetic vectors. Ferroelectric domains can be formed much smaller than magnetic domains and are capable of yielding much higher storage densities than magnetic storage mediums.

Various techniques can be used for reading back data stored on a ferroelectric storage medium. One technique which can be used to readback data uses the piezoelectric properties of the storage medium. However, this technique cannot operate at the high frequency necessary for high data rates, for example above 1 MHz. Another technique uses a scanning nonlinear dielectric microscope (SNDM) in which a lock-in amplifier is used to measure the nonlinear dielectric properties of the storage media. However, this technique also suffers from limited data rates because the lock-in sampling rate must be approximately ten times the data rate.

SUMMARY OF THE INVENTION

A transducer for use with a ferroelectric storage medium includes a read electrode configured to carry an electrical charge of a first charge polarity proximate a ferroelectric domain of the ferroelectric medium having a second charge polarity. During readback, if the first and second polarities have the same orientation, the polarity of the medium will not change. However, if the polarities have opposite orientations, the ferroelectric domain will change polarity and an electrical current will flow in the read electrode. If desired, a subsequent write operation can be performed to write back information following a read operation. The write operation can be to the same domain, or to a different domain. In one aspect, a slider is provided which includes the transducer. A disc storage system is also provided which includes such a slider.

Other features and benefits that characterize embodiments of the present invention will be apparent upon reading the following detailed description and review of the associated drawings.

BRIEF DESCRIPTION OF THE DRAWINGS

FIG. 4 is a front plan view of a ferroelectric transducer which includes a write electrode for use with a ferroelectric storage medium in accordance with the present invention.

FIG. 5 is a block diagram showing the transducer of FIG. 1 coupled to transducing circuitry and positioned proximate a storage medium.

FIG. 6 is a front plan view of a ferroelectric transducer which includes an outer shield.

FIG. 7 is a front plan view of a ferroelectric transducer which includes an outer and an inner shield.

FIG. 8 is a front plan view of a ferroelectric transducer showing another configuration of an inner shield.

DETAILED DESCRIPTION OF ILLUSTRATIVE EMBODIMENTS

In general, permanent storage devices in present use rely on magnetic hysteresis effects. For example, the magnetic vectors of magnetic material carried on a disc surface can be oriented in different directions to encode data. The data is read back by sensing the orientation of the magnetic field and decoding this measurement to recreate the stored information. There is an ongoing drive to reduction in bit sizes to achieve greater storage density. However, the size of the domains used in the magnetic storage medium are approaching to the minimum achievable size which is limited by thermal stability. In other words, as information density increases, the magnetic orientation becomes unstable. One alternative media that can be used to achieve higher storage density is a ferroelectric storage medium. Such a media may provide storage densities which are greater than 1 Tb/in$^2$.

Figure 1:
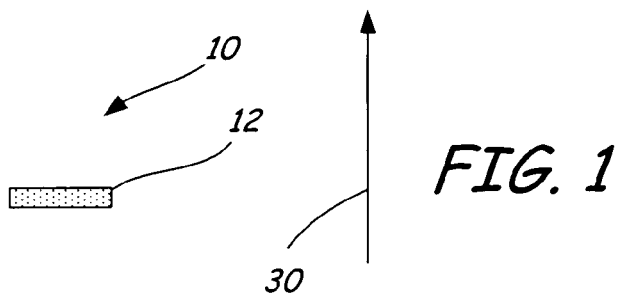
FIG. 1 is a front plan view of a ferroelectric transducer for use with a ferroelectric storage medium.
Figure 2:
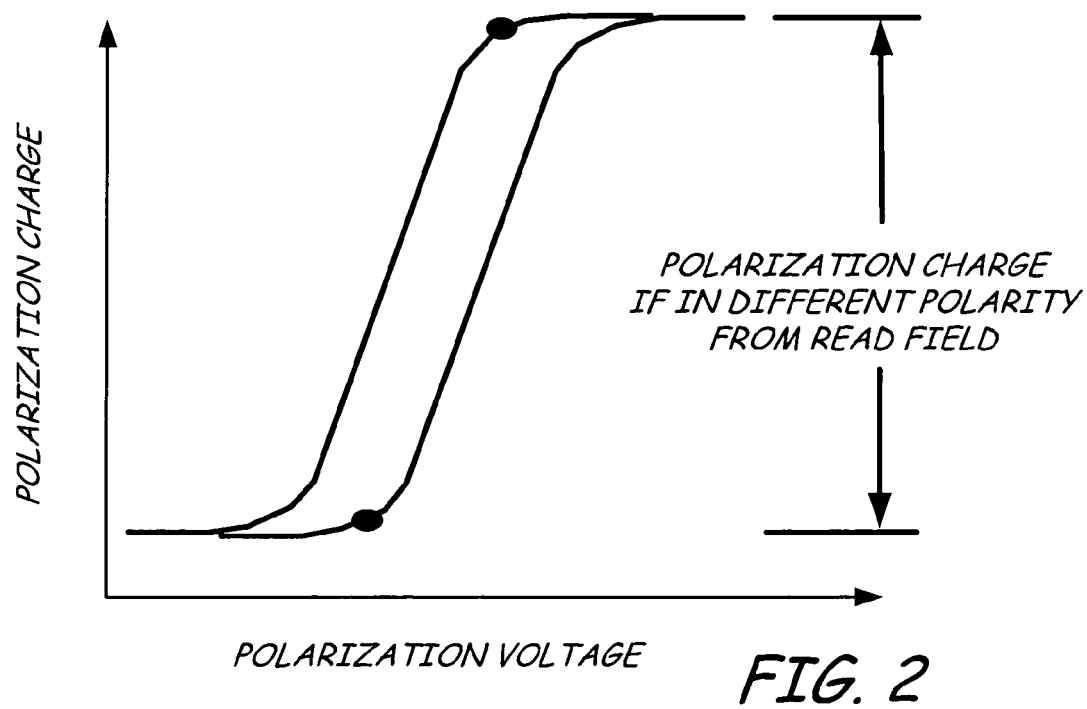
FIG. 2 is a graph of polarization charge versus polarization voltage for a ferroelectric readback mechanism.
Figure 3:
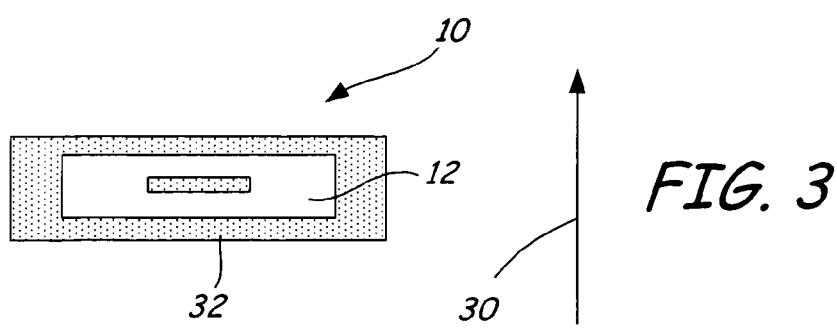
FIG. 3 is a front plan view of the transducer of FIG. 1 including an outer shield.

One problem associated with ferroelectric storage medium is the method used to recover stored information. One solution is to use a transducer 10 having a small read electrode 12 as shown in FIG. 1. Electrode 12 is polarized and is moved over the surface of a storage medium in a direction indicated by arrow 30. This can be used to read back information which has been stored on the medium. When the medium has an electric field which has a similar orientation as the electric field on the read electrode 12, there will be no change in the electric fields and no current will be output from the read electrode 12. However, if the polarity of the read electrode 12 is opposite of the polarity of the medium, the polarity of the medium will be flipped and switch directions such that a much larger current is emitted from the read electrode 12. FIG. 2 is a graph of polarization charge versus polarization voltage which illustrates this effect. Thus, the action of reading back the data destroys the stored information such that it cannot be recovered in subsequent readback operations. One technique which can be used to address this problem of erased data is to use the same read electrode 12 to write information back to the ferroelectric storage medium. In such an embodiment, a charge is placed on electrode 12 of sufficient magnitude to impress a similar field orientation on a domain of the storage medium. Further, as illustrated in FIG. 3, a shield 32 can enclose the electrode 12 to reduce noise and improve spacial resolution.

FIG. 4 is a front plan view of a transducer 10 for use with a ferroelectric storage medium in accordance with another example embodiment of the present invention. Transducer 10 includes a read electrode 12 and a write electrode 14 adjacent the read electrode 12. When the transducer 10 moves across a storage medium, write electrode 14 trails the lead electrode 12. The problem of destroying data during readback is addressed by the present invention which utilizes the write electrode 14 to re-write the data following reading of the data with the read electrode 12. The re-written data returns a domain on the ferroelectric storage medium to its condition prior to the read operation.

FIG. 5 is a block diagram showing transducer 10 positioned proximate ferroelectric storage medium 20 and coupled to transducing circuitry 22. Transducing circuitry 22 includes read circuitry 24 and write circuitry 26 which are both coupled to controller 28. Read electrode 12 comprises a small electrode which is moved relative to ferroelectric storage medium 20 in a direction indicated by arrow 30.

During operation, read circuitry 24 polarizes read electrode 12 by placing a charge on electrode 12. When the electric field from the medium 20 proximate read electrode 12 has the same orientation as that of the read electrode 12, there is no change in the orientation of the ferroelectric medium and no current flows. However, when the polarities are opposite, the polarity of the medium 20 will be flipped. This causes a small current to be emitted from the read electrode 12. Read circuitry 24 detects this current and provides a signal to controller 28. The controller 28 actuates write circuitry 26 to polarize write electrode 14 as write electrode moves over the domain of the medium 20 that read electrode "flipped". This causes the write electrode 14 to re-write the data onto the medium 20 that was destroyed by the read operation. Thus, the data on the surface of medium 20 is recovered by directing the direction of the electric field from medium 20. If the electric field is oriented in the same direction as that from read electrode 12, the polarity is the same as that of read electrode 12 and no current is sensed. If, on the other hand, a current is detected, the electric field of medium from the domain proximate read electrode 12 is in the opposite direction of that from read electrode 12. Data is recovered by monitoring the presence or absence of current.

The current detected by readback circuitry 24 when the orientation of the electric field and ferroelectric medium 20 is flipped is relatively small. For example, if the bit spacing in medium 20 is 10 nm by 10 nm, only about 500 electrons will be emitted which is a charge of $8 \times 10^{-17}$ coulombs. Thus, even a small amount of noise can seriously degrade the readback signal. Various techniques can be used to reduce noise in the readback signal. For example, FIG. 6 is a front plan view of an embodiment of transducer 10 which includes an outer shield 32. Shield 32 can be electrically grounded and used to reduce the noise sensed by read electrode 12. Shield 32 prevents stray signals or fields from reaching read electrode 12.

FIG. 7 is a bottom plan view of transducer 10 in accordance with another embodiment of transducer 10 to configure to reduce noise sensed by the read electrode 12. In the embodiment of FIG. 7, in addition to including an outer shield 32, an inner shield 34 is provided and positioned between read electrode 12 and write electrode 14. This configuration reduces noise or other interference from write electrode 14 sensed by read electrode 12. For example, the write operation performed by write electrode 14 can be sensed by read electrode 12 causing an error during readback. FIG. 8 is a bottom plan view of transducer 10 showing a similar embodiment in which inner shield 36 extends along the entire distance between the walls of outer shield 32. This provides yet further isolation of the readback signal from write electrode 14.

In FIGS. 4-8, the read electrode 12 and the write electrode 14 are shown as having the same width. However, these widths can be controlled as desired. For example, in some embodiments it may be desirable for the read electrode 12 to be wider than the write electrode 14.

The various electrodes and shields illustrated in FIGS. 4-8 can be fabricated of metal and are preferably of a material having a relatively high conductivity. The materials are preferably in a dielectric, such as an oxide. The transducer 10 can be fabricated in accordance with any appropriate technique. For example, fabrication techniques used in the manufacture of magnetic transducing heads can be employed. The transducer can be employed with any type of storage medium. For example, the transducer is well suited for use with a disc storage device.

Figure 9:
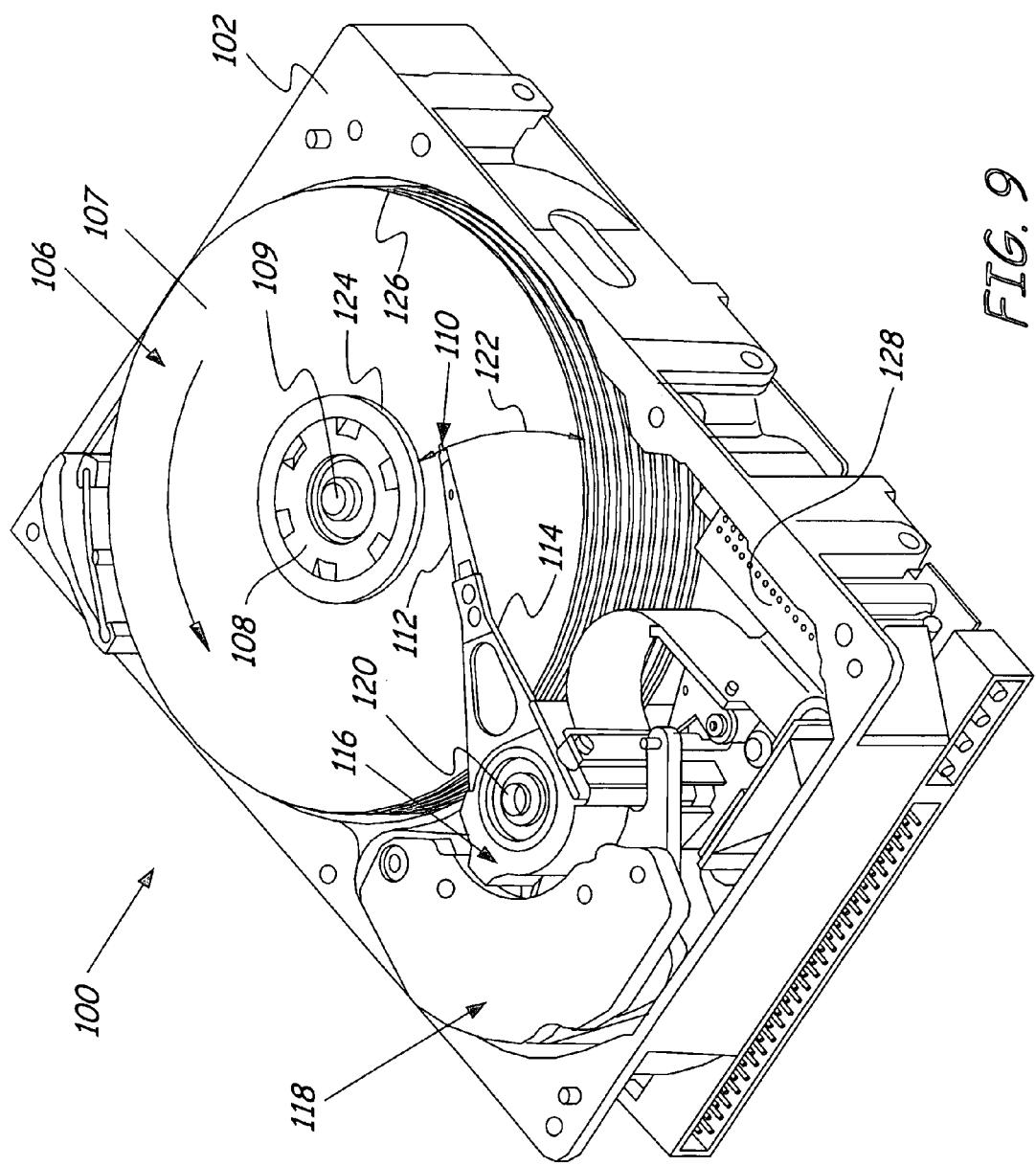
FIG. 9 is an isometric view of a disc drive in which embodiments of the present invention are implemented.

FIG. 9 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108 and includes a plurality of discs 107. Disc pack 106 includes a plurality of individual discs (storage media), which are mounted for co-rotation about central axis 109. Each disc surface has an associated disc head slider 110 which is mounted to disc drive 100 for communication with the disc surface. In the example shown in FIG. 9, sliders 110 are supported by suspensions 112 which are in turn attached to track accessing arms 114 of an actuator 116. The actuator shown in FIG. 9 is of the type known as a rotary moving coil actuator and includes a voice coil motor (VIM), shown generally at 118. Voice coil motor 118 rotates actuator 116 with its attached sliders 110 about a pivot shaft 120 to position heads 110 over a desired data track along an accurate path 122 between a disc inner diameter 124 and a disc outer diameter 126. Voice coil motor 118 is driven by servo electronics 130 based on signals generated by transducers 10 (not shown in FIG. 9) carried on sliders 110 and a host computer (not shown).

The transducer 10 illustrated in FIGS. 4 and 6-8 can be used in the disc drive 100 shown in FIG. 9. In such an embodiment, an air bearing surface (ABS) of the transducer 10 is directed toward the surface of a disc 107. This air bearing surface is shown in the plan views set forth in FIGS. 4 and 6-8. By reducing the spacing between the transducer 10 and the surface of the disc 107, the storage density can be increased. Further, the configuration of transducer 10 illustrated in FIGS. 4 and 6-8 has a number of advantages. The design is relatively simple and there are no issues related to the "throat" height of the transducer. In the design of magnetic transducers, throat height is a critical dimension which must be accurately controlled. However, throat height tolerance is not a design constraint of the transducer 10 of the invention because flux from the transducer 10 cannot leak from the structure. Such leakage can occur in a magnetic recording head. Instead, the shield configurations illustrated in FIGS. 6-8 confine the electric field. The side fringing of the ferroelectric transducer 10 of the present invention is less than in comparison to conventional magnetic recording heads because the shield of the present invention can be maintained at the same potential as the storage medium 20. In contrast, the side shields used with magnetoresistive heads tend to draw flux from the main pole thereby increasing side fringing. This increases the production yield of the transducer 10. Further, current magnetic transducing heads have difficulty generating a sufficiently large magnetic field to write data onto a thermally stable magnetic medium. In contrast, the ferroelectric transducer 10 of the present invention can generate electric fields which are far in excess of that which is required for writing data.

Figure 10A:
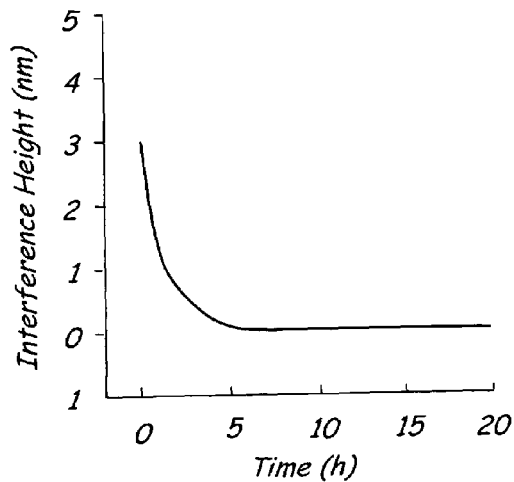
FIG. 10A is a graph of interference height versus time showing the wear-in of a slider.
Figure 10B:
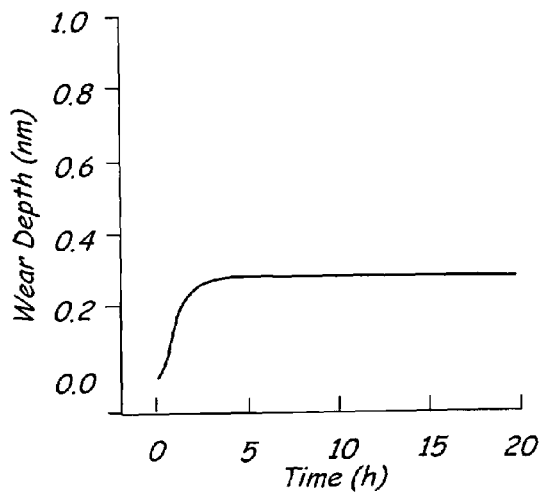
FIG. 10B is a graph of wear depth versus time showing the wear-in of a slider.

In view of the above advantages of the ferroelectric transducer 10 of the invention, it can be seen that the distance requirements between the transducer 10 and the medium 20 is significantly relaxed in comparison to magnetic transducers. In one aspect, the present invention includes a slider which allows for a certain amount of wear to occur at the head during normal operation. FIG. 10A is a graph of interference height versus time and FIG. 10B is a graph of wear depth versus time which illustrate a slider wearing into an equilibrium point during normal operation. In FIGS. 10A and 10B, this equilibrium is reached in about 2.5 hours. Using such a configuration, manufacturing tolerances can be relaxed and the slider can go through an initial wear period to reach an optimum fly height.

Figure 11A:
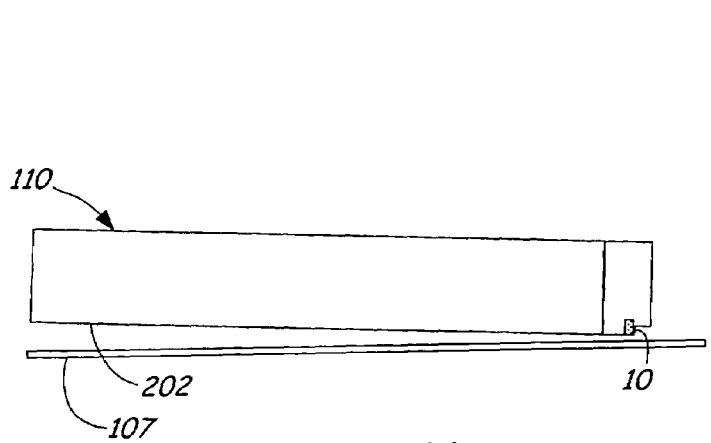
FIG. 11A is a side view of a slider carrying a ferroelectric transducer proximate a ferroelectric storage medium.
Figure 11B:
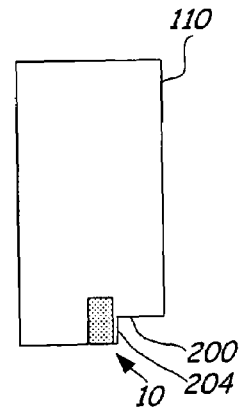
FIG. 11B is an enlarged view of a trailing edge trim region of the slider of FIG. 11A.

FIG. 11A is a side view of slider 110 proximate storage medium 107 and FIG. 11B is an enlarged view showing a trailing edge trim region 200 of slider 110. Slider 110 is one example configuration of a slider for carrying a ferroelectric transducer 10 in accordance with the invention. The slider 110 shown in FIGS. 11A and 11B is configured to contact the recording medium 107 during an initial wear-in period until a equilibrium is reached. Preferably, any debris generated by the wear-in process does not adhere to the slider 110 or otherwise cause head crashes. Further, the height (i.e., depth in a direction into slider 110) of the electrodes 12 and 14 (see FIGS. 4 and 6-8) should be sufficiently large to withstand the wear-in. The configuration with trailing edge trim region 200 ensures that transducer 10 remains at the lowest point of slider 110. The transducer 10 is relatively insensitive to throat height variations due to wear. Any debris from wear can collect in trim region 200 without interfering in transducer operation. In the embodiment shown in FIGS. 11A and 11B, the slider 110 has an air bearing surface (ABS) 202 which faces the storage medium 20. Typical air bearing slider designs used with magnetic storage medium can be utilized with the ferroelectric transducer of the invention. However, any appropriate configuration can be used.

The length of the trailing edge trim region 200 can be optimized to obtain the desired proximity between transducer 10 and medium 107. For example, the transducer 10 can be located near the step 204 that defines the trim region 200. The trailing edge trim region 200 can comprise a notch in the trailing edge of the slider 110, for example in an alumina encapsulation layer, and is used to minimize the interference between the slider 110 and the storage medium 20. For the ferroelectric transducer 10 of the present invention, it is preferable that the transducer 10 be placed close to the medium 20. Therefore, the trim region 200 is preferably close to the transducer 10 such that only a small amount of wear is needed to place the transducer 10 at the low point of the slider 110 closest to the disc 107. As wear occurs during operation of the storage system 100, the trailing edge trim region ensures that the transducer 10 remains at the lowest point of the slider 110. Further, the trailing edge trim region 200 can also provide a repository for wear debris. Any debris will collect the trim region 200 because it is recessed from the head/disc interface defined by the transducer 10 and is downstream from the transducer 10. The geometry of the trailing edge trim region 200 can be optimized for proximity recording using texturing or other techniques and by controlling how the contact area changes during the wear-in period.

The embodiment shown in FIGS. 11A and 11B of slider 110 is for example purposes only. Any slider configuration which places the transducer 10 in close proximity with the storage medium 20 (such as disc 107) can be employed. In another example embodiment, the transducer 10 is placed on a pad which protrudes from the air bearing surface 202 of slider 110.

Figure 12:
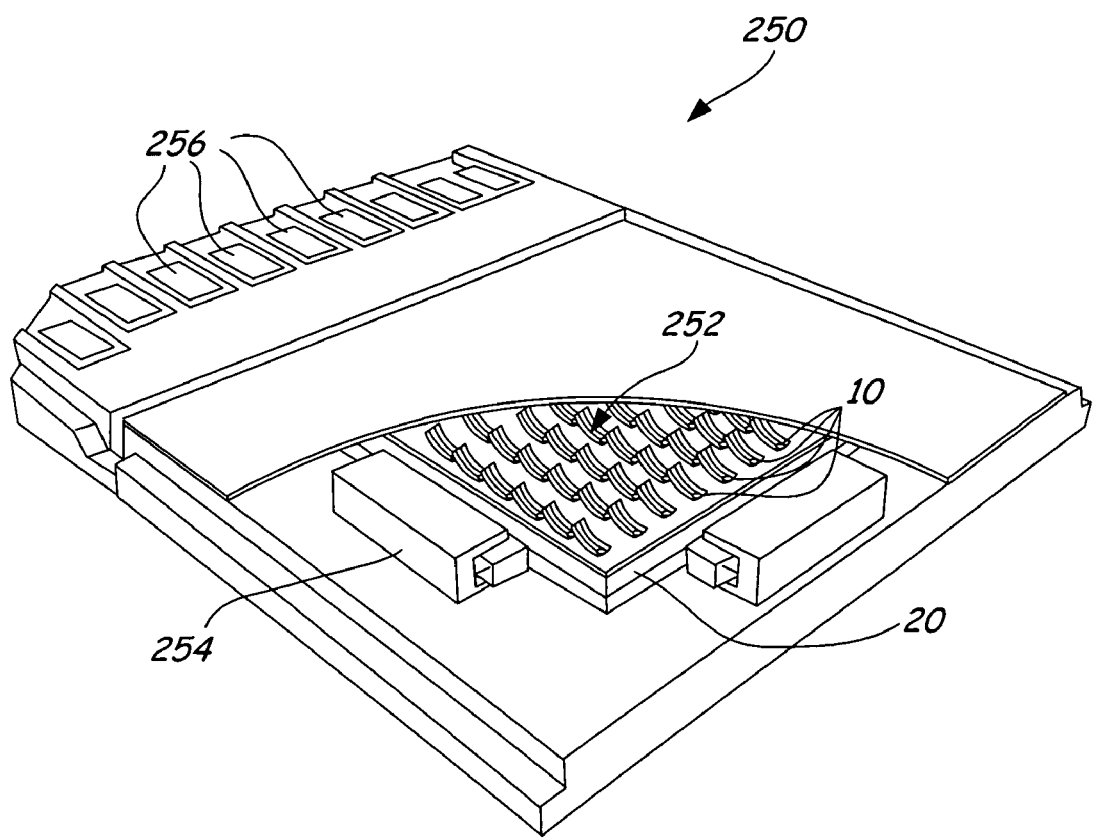
FIG. 12 is a perspective view of a ferroelectric storage array in accordance with the present invention.

FIG. 12 is a perspective view of a ferroelectric storage array 250 which illustrates another example implementation of a storage system which utilizes the present invention. In the ferroelectric storage array 250 of FIG. 12, an array 252 of ferroelectric heads 10 is positioned adjacent storage medium 20. In the configuration shown in FIG. 9 the array 252 in the medium 20 are planar and extend generally parallel with each other. The array 252 comprises a plurality of read electrodes (not shown in FIG. 12) which are operably coupled to connectors 256. The storage medium 220 is coupled to at least one actuator 254 which is configured to move the medium 220 relative to array 252. This movement causes the ferroelectric heads 10 to be moved relative to the individual ferroelectric domains on array 20. If the transducer 10 is configured similar to the configuration illustrated in FIGS. 1 or 3, a single electrode 12 can be used with each head 10. One technique which can be used to address the issue regarding erased data is to maintain at least one sector on the storage medium 20 which is available for writing data during a read operation. This available sector is thereby used to reproduce the data which is being destructively read back.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the ferroelectric transducer while maintaining substantially the same functionality without departing from the scope and spirit of the present invention. In addition, although the preferred embodiment described herein is directed to a disc storage system, it will be appreciated by those skilled in the art that the teachings of the present invention can be applied to any storage system which utilizes ferroelectric techniques without departing from the scope and spirit of the present invention.

In one embodiment, an electrode depth of 20 nm is used. The depth is easily implemented using current fabrication techniques. Shallower depth can also be used, for example 5 nm. The transducer width can be determined by a lithographic process, for example, lithography 40 nm with an electron beam. The height of the transducer can be several microns, and is limited by lithography. Typical spacing from the medium ranges from 50 nm to 1 um. Thus, in one specific example, the read electrode may have a thickness of 5 and 20 nm and a height of several microns, for example. The write electrode may have a thickness of 20 to 40 nm and a height of several microns. Example spacing between the read and write electrons can be between 50 nm and 1 μm.

What is claimed is:

1. A ferroelectric transducer for use with a ferroelectric storage medium, comprising:
    a read electrode that carries an electrical charge of a first charge polarity orientation proximate a ferroelectric domain of the ferroelectric storage medium which has a second charge polarity orientation;
    an electric shield which extends around the read electrode arranged to confine an electric field and thereby reduce noise sensed by the read electrode and increase spacial resolution of the read electrode; and
    wherein the ferroelectric domain changes polarity and an electrical readback current flows in the read electrode when the first charge polarity orientation and the second charge polarity orientation are opposite.

2. The ferroelectric transducer of claim 1 including:
    a write electrode proximate a read electrode that applies an electric field to the ferroelectric medium to thereby impress an electrical polarization on ferroelectric domains of the ferroelectric medium; and
    wherein the write electrode trails the read electrode and impresses the second charge polarity on the ferroelectric domain following a read operation in which the charge polarity of the ferroelectric domain was changed.

3. The ferroelectric transducer of claim 2 including a second electric shield which extends between the read electrode and the write electrode.

4. Then ferroelectric transducer of claim 2 wherein the write electrode and read electrode are carried in a dielectric material.

5. The ferroelectric transducer of claim 2 including a controller that applies a charge to the write electrode following a read operation in which the charge polarity of the ferroelectric domain was changed.

6. The ferroelectric transducer of claim 1 including a controller that applies the electrical charge to the read electrode and sense the readback current.

7. A data storage system comprising: a ferroelectric transducer that moves relative to a ferroelectric storage medium, the ferroelectric transducer comprising: a read electrode that carries an electrical charge of a first charge polarity orientation proximate a ferroelectric domain of the ferroelectric storage medium which has a second charge polarity orientation; an electric shield which extends around the read electrode arranged to confine an electric field and thereby reduce noise sensed by the read electrode and increase spacial resolution of the read electrode; and wherein the ferroelectric domain changes polarity and an electrical readback current flows in the read electrode when the first charge polarity orientation and the second charge polarity orientation are opposite.

8. The data storage system of claim 7 wherein the transducer is carried on a slider proximate the surface.

9. The data storage system of claim 8 wherein the slider is configured to wear until an equilibrium is reached during operation.

10. The data storage system of claim 8 wherein the slider includes a trim region proximate a trailing edge of the slider.

11. The data storage system of claim 10 wherein the ferroelectric transducer is positioned proximate the trim region, whereby the trim region is positioned between the ferroelectric transducer and the trailing edge of the slider.

12. A storage system comprising:
    a ferroelectric storage medium;
    an array of ferroelectric transducers; and an actuator that moves the storage medium relative to the array, wherein each ferroelectric transducer of the array of ferroelectric transducers comprises: a read electrode that carries an electrical charge of a first charge polarity orientation proximate a ferroelectric domain of the ferroelectric storage medium which has a second charge polarity orientation; an electric shield which extends around the read electrode arranged to confine an electric field and thereby reduce noise sensed by the read electrode and increase spacial resolution of the read electrode; and wherein the ferroelectric domain changes polarity and an electrical readback current flows in the read electrode when the first charge polarity orientation and the second charge polarity orientation are opposite.

13. A method of reading data stored on a ferroelectric storage medium, comprising:
    applying an electric charge to a read electrode placed proximate a ferroelectric domain having a first charge polarity on the ferroelectric medium;
    shielding the read electrode with an electric shield, which extends around the read electrode, to confine an electric field and thereby reduce noise sensed by the read electrode and increase spacial resolution; and
    sensing an electrical current in the read electrode due to the charge polarity of the ferroelectric domain switching from the first charge polarity to a second charge polarity when the first charge polarity is the same as a charge polarity of the read electrode.

14. The method of claim 13 including:
    positioning a write electrode proximate the ferroelectric domain and proximate the read electrode; and
    applying an electric charge to the write electrode in response to sensed electrical current in the read electrode to impress the first charge polarity on to the ferroelectric domain.

15. The method of claim 14 including providing a second electric shield which extends between the read electrode and the write electrode.

16. The method of claim 13 wherein the read electrode is carried in a dielectric material.

17. The method of claim 13 including moving the ferroelectric storage medium relative to an away of read electrodes.

18. A method implemented in a disc storage system having a ferroelectric transducer that reads data stored on a ferroelectric storage medium, the method comprising: applying an electric charge to a read electrode placed proximate a ferroelectric domain having a first charge polarity on the ferroelectric medium; shielding the read electrode with an electric shield, which extends around the read electrode, to confine an electric field and thereby reduce noise sensed by the read electrode and increase spacial resolution; and sensing an electrical current in the read electrode due to the charge polarity of the ferroelectric domain switching from the first charge polarity to a second charge polarity when the first charge polarity is the same as a charge polarity of the read electrode.

19. The method of claim 18 including carrying the transducer on a slider proximate the disc surface.

20. The method of claim 19 including wearing a trailing edge of the slider until an equilibrium is reached.

21. The method of claim 20 wherein the slider includes a trim region proximate a trailing edge of the slider.

22. The method of claim 21 wherein the ferroelectric transducer is positioned proximate the trim region, whereby the trim region is positioned between the ferroelectric transducer and the trailing edge of the slider.

23. A ferroelectric transducer for use with a ferroelectric storage medium, comprising:
- a read electrode means placed proximate a ferroelectric domain having a first charge polarity on the ferroelectric medium the read electrode means for sensing electrical charge of the ferroelectric domain;
- electric shield means extending around the read electrode for shielding the read electrode from noise and increasing spacial resolution of the read electrode by confining an electric field; and
- means for sensing an electrical current from in the read electrode means due to the charge polarity of the ferroelectric domain switching from the first charge polarity to a second charge polarity when the first charge polarity is the same as a charge polarity of the read electrode means.

24. The ferroelectric transducer of claim 23 including a write electrode means for writing an electrical charge to a ferroelectric domain of the medium.

25. The ferroelectric transducer of claim 23 including:
- means for applying an electric charge to the write electrode means in response to sensed electrical current from the read electrode means to thereby impress the first charge polarity on to the ferroelectric domain.

26. The ferroelectric transducer of claim 24 including a second electric shield means for shielding the read electrode from the write electrode.

\* \* \* \* \*

UNITED STATES PATENT AND TRADEMARK OFFICE
CERTIFICATE OF CORRECTION

PATENT NO. : 7,397,624 B2  Page 1 of 1
APPLICATION NO. : 10/702348
DATED : July 8, 2008
INVENTOR(S) : Johns et al.

It is certified that error appears in the above-identified patent and that said Letters Patent is hereby corrected as shown below:

<u>Column 7</u>

Line 37 delete "Then" and insert --The--.

<u>Column 8</u>

Line 49 delete "away" and insert --array--.

Signed and Sealed this

Thirtieth Day of September, 2008

JON W. DUDAS
*Director of the United States Patent and Trademark Office*